(12) United States Patent
Shi et al.

(10) Patent No.: US 12,098,549 B2
(45) Date of Patent: Sep. 24, 2024

(54) COMBINED ACCESSORY OF IN-SITU CONCRETE 3-D PRINTED HORIZONTAL LOAD-BEARING MEMBER AND PREPARATION METHOD

(71) Applicant: INNER MONGOLIA UNIVERSITY OF TECHNOLOGY, Hohhot (CN)

(72) Inventors: Yong Shi, Hohhot (CN); Yongli Hou, Hohhot (CN); Xiaoyan He, Hohhot (CN); Yuanhong Hao, Hohhot (CN)

(73) Assignee: INNER MONGOLIA UNIVERSITY OF TECHNOLOGY, Hohhot (CN)

( * ) Notice: Subject to any disclaimer, the term of this patent is extended or adjusted under 35 U.S.C. 154(b) by 198 days.

(21) Appl. No.: 17/737,668

(22) Filed: May 5, 2022

(65) Prior Publication Data

US 2022/0364364 A1 Nov. 17, 2022

(30) Foreign Application Priority Data

May 11, 2021 (CN) .......................... 202110509102.6

(51) Int. Cl.
| | | |
|---|---|---|
| *E04C 5/04* | (2006.01) | |
| *B33Y 10/00* | (2015.01) | |
| *B33Y 80/00* | (2015.01) | |
| *E04B 5/32* | (2006.01) | |
| *E04B 7/20* | (2006.01) | |
| *E04C 3/20* | (2006.01) | |
| *E04G 21/02* | (2006.01) | |

(52) U.S. Cl.
CPC ................ *E04C 5/04* (2013.01); *B33Y 10/00* (2014.12); *B33Y 80/00* (2014.12); *E04G 21/02* (2013.01); *E04B 5/32* (2013.01); *E04B 7/20* (2013.01); *E04C 3/20* (2013.01)

(58) Field of Classification Search
CPC .. E04C 5/04; E04C 3/20; B33Y 10/00; B33Y 70/03; B33Y 80/00; E04G 21/0463; E04G 21/02; E04B 7/026; E04B 7/20; E04B 5/32

See application file for complete search history.

(56) References Cited

FOREIGN PATENT DOCUMENTS

| | | | | | |
|---|---|---|---|---|---|
| CN | 111335636 | A | * | 6/2020 | |
| IN | 201821038497 | A | * | 4/2020 | |
| KR | 20180016100 | A | * | 2/2018 | |
| WO | WO-2017035584 | A1 | * | 3/2017 | ............. B28B 1/001 |
| WO | WO-2020252532 | A1 | * | 12/2020 | ............. B28B 1/001 |

* cited by examiner

*Primary Examiner* — Theodore V Adamos
(74) *Attorney, Agent, or Firm* — Troutman Pepper Hamilton Sanders LLP

(57) ABSTRACT

This technology comprises a combined accessory of an in-situ concrete 3-D printed horizontal load-bearing member and a preparation method. The combined accessory includes 3-D printed concrete and a bottom mesh, the 3-D printed concrete contains fine aggregates having the particle size of 0.08 mm-4.75 mm, and the fluidity of the 3-D printed concrete is larger than or equal to 110 mm and smaller than or equal to 190 mm; the bottom mesh is a reinforcing mesh or expanded metal, the diameter of the reinforcing bar is larger than or equal to 0.5 mm, and the mesh aperture of the reinforcing mesh is smaller than or equal to 7.5 times of an upper limit of the particle size of the fine aggregate and is larger than or equal to 7.5 times of a lower limit of the particle size of the fine aggregate.

5 Claims, 5 Drawing Sheets

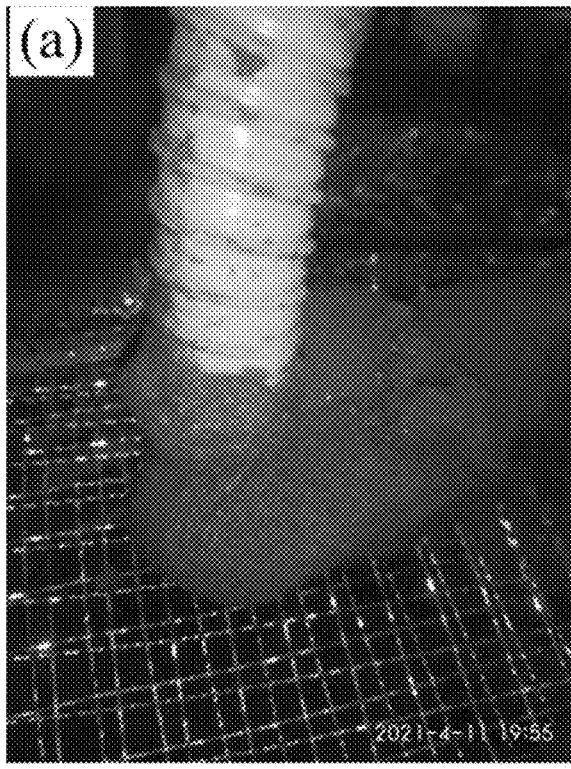
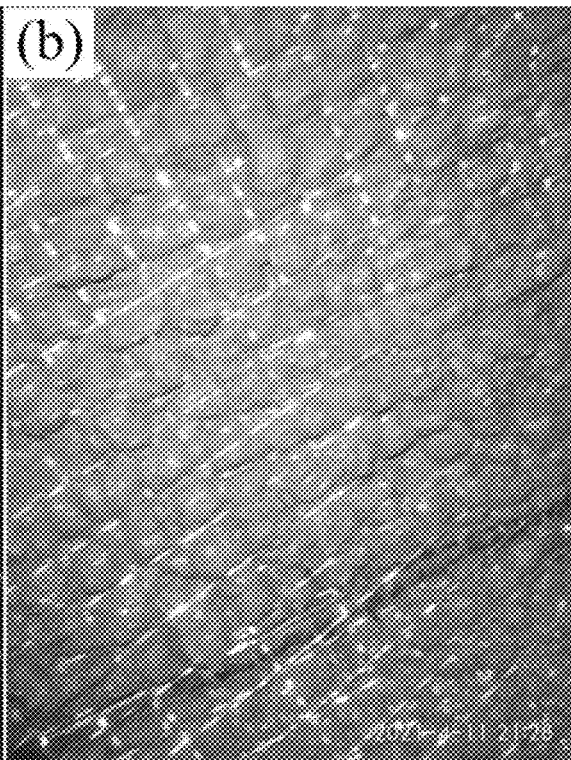
FIG. 3a　　　　　　　　　　　　　　　　FIG. 3b
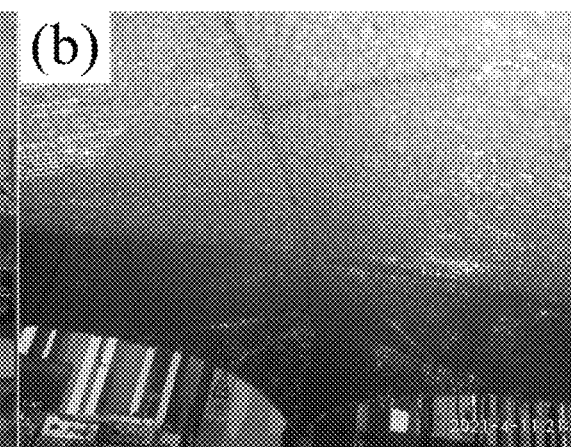
FIG. 4a　　　　　　　　　　　　　　　　FIG. 4b

FIG. 5a
FIG. 5b
FIG. 6a
FIG. 6b

COMBINED ACCESSORY OF IN-SITU CONCRETE 3-D PRINTED HORIZONTAL LOAD-BEARING MEMBER AND PREPARATION METHOD

This application claims the benefit of China Patent Application No. 202110509102.6, filed May 11, 2021, which is hereby incorporated by reference in its entirety.

FIELD

The present disclosure relates to the technical field of building construction. In particular relates to a combined accessory of an in-situ concrete 3-D printed horizontal load-bearing member, and a preparation method.

BACKGROUND ART

As the concrete adopted for concrete 3-D printing technology needs a period of time (generally 30 min to 1 hour) to reach initial setting after being extruded from a nozzle, only the printing of the vertical load-bearing member can be achieved at present, such as walls or columns.

In a case that the horizontal load-bearing members, such as floor systems, roofs, beams, cantilever slabs and the like, need to be printed, the traditional bottom mold or a prefabricated beam and slab member on-site assembling mode still needs to be adopted, which cannot achieve in-situ support-free printing of the members.

The reinforcing mesh sheet in the prior art has a mesh of 100-200 mm, for the wall or column structures, although part of the concrete permeates from the meshes of the reinforcing mesh sheet, the packing and setting of the wall or the column are not affected. For the horizontal load-bearing member, 3-D printed concrete cannot be hung at the meshes of the reinforcing mesh, most of the concrete leaks out of the meshes and falls, and bottom printing of the horizontal load-bearing member cannot be achieved through the reinforcing mesh sheet.

SUMMARY

To this end, the technical problem needing to be solved by the present disclosure is to provide a combined accessory of an in-situ concrete 3-D printed horizontal load-bearing member, and a preparation method.

To solve the technical problem, the present disclosure provides the following technical solutions:

The combined accessory of the in-situ concrete 3-D printed horizontal load-bearing member includes a 3-D printed concrete and a bottom mesh, wherein the 3-D printed concrete contains fine aggregate having a particle size of 0.08 mm-4.75 mm, and the fluidity of the 3-D printed concrete is larger than or equal to 110 mm and smaller than or equal to 190 mm; the bottom mesh is a reinforcing mesh or expanded metal, the diameter of the reinforcing bar is larger than or equal to 0.5 mm, and the aperture of a mesh of the reinforcing mesh is smaller than or equal to 7.5 times (4.75 mm×7.5) of an upper limit of the particle size of the fine aggregate and is larger than or equal to 7.5 times (0.08 mm×7.5) of a lower limit of the particle size of the fine aggregate.

In accordance with the combined accessory of the in-situ concrete 3-D printed horizontal load-bearing member, the fine aggregate is the sand for construction [in line with GB/T14684-2011].

In accordance with the combined accessory of the in-situ concrete 3-D printed horizontal load-bearing member, the fine aggregate is coarse sand, medium sand, or fine sand [in line with GB/T14684-2011].

In accordance with the combined accessory of the in-situ concrete 3-D printed horizontal load-bearing member, the reinforcing bar is made of a metallic material or a non-metallic material.

In accordance with the combined accessory of the in-situ concrete 3-D printed horizontal load-bearing member, when the bottom mesh bears the weight of the first layer of 3D printed concrete alone, the diameter of the reinforcing bar of the bottom mesh is larger than or equal to 1 mm; and when the bottom mesh and a reinforcing cage bear the weight of the first layer of 3-D printed concrete together, the diameter of the reinforcing bar of the bottom mesh is larger than or equal to 0.5 mm.

A preparation method of an in-situ concrete 3-D printed horizontal load-bearing member, which employs the 3-D printed concrete and the bottom mesh according to claim 1, and specifically comprises the following steps:

(1) providing the bottom mesh according to a structure and span of the horizontal load-bearing member;

(2) when the bottom mesh bears the weight alone: fixing two or four sides of the bottom mesh to connection embedded parts reserved on support walls on two sides of four sides in a welding or binding mode, then directly printing the first layer of 3-D printed concrete on the bottom mesh, and enabling the first layer of printed concrete to flow out through the meshes of the bottom mesh to wrap the bottom mesh;

when the bottom mesh and the reinforcing cage bear the weight together: binding the bottom mesh to the lower part of the reinforcing cage, and placing a spacer block between the reinforcing cage and the bottom mesh to control a distance between the reinforcing cage and the bottom mesh, and then directly printing the first layer of 3-D printed concrete on the bottom mesh; or laying the reinforcing cage on the first layer of printed concrete after the setting of the first layer of concrete; and (3) after the setting of the first layer of concrete, continuing the printing of the 3-D printed concrete on the first layer of concrete until a predetermined thickness of the horizontal load-bearing member is reached.

In accordance with the preparation method of the in-situ concrete 3-D printed horizontal load-bearing member, the fine aggregate is sand for construction [in line with GB/T14684-2011], and the reinforcing bar is made of a metallic material or a non-metallic material.

In accordance with the preparation method of the in-situ concrete 3-D printed horizontal load-bearing member, when the bottom mesh bears the weight of the first layer of 3D printed concrete alone, the diameter of the reinforcing bar of the bottom mesh is larger than or equal to 1 mm; and when the bottom mesh and the reinforcing cage bear the weight of the first layer of 3-D printed concrete together, the diameter of the reinforcing bar of the bottom mesh is larger than or equal to 0.5 mm.

In accordance with the preparation method of the in-situ concrete 3-D printed horizontal load-bearing member, wherein when the span of the horizontal load-bearing member is smaller than or equal to 4.2 m, the bottom mesh is used for bearing the weight alone; and when the span of the horizontal load-bearing member is larger than 4.2 m, the bottom mesh and the reinforcing cage are used for bearing the weight together.

In accordance with the preparation method of the in-situ concrete 3-D printed horizontal load-bearing member, wherein, according to the structure of the horizontal load-bearing member, the bottom mesh can be a plane bottom mesh or a curved bottom mesh, and can also be prefabricated into a V shape or a wave shape.

In accordance with the above technical solutions, the following beneficial effects are as follows:

1. A bottom mesh adopted in concrete 3-D printing is defined, and a metal mesh or a non-metal mesh with a certain rigidity is used as the bottom mesh, and the first layer of printed concrete is directly printed on the bottom mesh;
2. the 3-D printed concrete permeates along the meshes of the bottom mesh but does not fall, that is, the 3-D printed concrete permeates downwards along the meshes to exceed the lower plane of the reinforcing mesh but does not fall, thus wrapping the reinforcing mesh. As the 3-D printed concrete has excellent cohesiveness, the bottom mesh is wrapped in the concrete after the first layer of concrete is printed, and then the concrete and the bottom mesh are combined into a whole; a support can be formed after the setting and hardening of the concrete, and then multiple layers of concrete can be continuously printed and stacked on the support;
3. according to the span and structure type of the printed horizontal load-bearing member, when the span is smaller than or equal to 4.2 m, the bottom mesh can bear the weight of the first layer of 3-D printed concrete alone, and when the span is larger than 4.2 m, the bottom mesh can be hung at the lower part of the reinforcing cage to bear the weight of the first layer of concrete together;
4. when the bottom mesh bears the first layer of 3-D printed concrete alone, after the first layer of concrete is hardened, the reinforcing cage can be laid on the first layer of concrete for subsequent printing, and when the use load is not large, there is no need to lay the reinforcing bars;
5. the shape of the bottom mesh can employ a plane mesh or a curved mesh, and can also be prefabricated into a V shape or a wave shape to enhance the rigidity;
6. as only the diameter of the reinforcing bar and the mesh aperture in the bottom mesh need to be in fit with the particle size of the fine aggregate in the 3-D printed concrete and the fluidity of the 3-D printed concrete, the concrete and the bottom mesh can be fused together; that is, the 3-D printed concrete contains the fine aggregates having the particle size of 0.08 mm-4.75 mm, and the fluidity of the 3-D printed concrete is larger than or equal to 110 mm and smaller than or equal to 190 mm; the bottom mesh is the reinforcing mesh, the diameter of the reinforcing bar is larger than or equal to 0.5 mm, and the aperture of the mesh of the reinforcing mesh is smaller than or equal to 7.5 times of the maximum particle size of the fine aggregate, and larger than or equal to 7.5 times of the minimum particle size of the fine aggregate; and
7. after the first layer of concrete is printed, part of mortar extruded from the lower part of the bottom mesh is manually smoothed, or can be left untreated, and then is smoothed by plastering during the later-stage internal decoration of the building.

BRIEF DESCRIPTION OF THE DRAWINGS

FIG. 3a is a partial diagram of a printing nozzle for a first layer of 3-D concrete printing in an example 1 of the present disclosure;

FIG. 3b is a partial diagram of a bottom surface of a bottom mesh after the printing of a first layer of 3-D concrete in an example 1 of the present disclosure;

FIG. 4a is an overall effect diagram after printing of a first layer of 3-D concrete in an example 1 of the present disclosure;

FIG. 4b is a bottom surface effect diagram after printing of a first layer of 3-D concrete in an example 1 of the present disclosure;

FIG. 5a is an overall effect diagram after 3-D printing of a second layer of concrete in an example 1 of the present disclosure;

FIG. 5b is a partial effect diagram after 3-D printing of a second layer of concrete in an example 1 of the present disclosure;

FIG. 6a is a 3 person (total weight of 2.05 KN) loading test diagram after 4 days of age of the 3-D printing of the second layer of concrete in an example 1 of the present disclosure;

FIG. 6b is a 5 person (total weight of 3.25 KN) loading test diagram after 4 days of age of the 3-D printing of the second layer of concrete in an example 1 of the present disclosure;

DETAILED DESCRIPTION

Example 1

Figure 1:
FIG. 1 is a diagram of a reinforcing cage for manufacturing a roof in an example 1 of the present disclosure.

A combined accessory of an in-situ concrete 3-D printed horizontal load-bearing member in this example includes 3-D printed concrete and a bottom mesh, wherein the 3-D printed concrete comprises fine aggregates having a particle size of 0.08 mm to 4.75 mm, and the fluidity of the 3-D printed concrete is larger than or equal to 110 mm and smaller than or equal to 190 mm; the bottom mesh is a reinforcing mesh, the diameter of the reinforcing bar is larger than or equal to 0.5 mm, and the mesh aperture of the reinforcing mesh is smaller than or equal to 7.5 times (4.75 mm×7.5) of an upper limit of the particle size of the fine aggregate, and larger than or equal to 7.5 times (0.05 mm×7.5) of a lower limit of the particle size of the fine aggregate.

The fine aggregate is sand for construction [in line with GB/T14684-2011], such as coarse sand, medium sand, or fine sand [in line with GB/T14684-2011]; the reinforcing bar is made of a metallic material or a non-metallic material, and when the bottom mesh bears the weight of the first layer of 3-D printed concrete alone, the diameter of the reinforcing bar of the bottom mesh is larger than or equal to 1 mm; and when the bottom mesh and a reinforcing cage bear the weight of the first layer of 3-D printed concrete together, the diameter of the reinforcing bar of the bottom mesh is larger than or equal to 0.5 mm.

The 3-D printed concrete permeates along the meshes of the bottom mesh but does not fall, that is, the 3-D printed concrete permeates downwards along the meshes to exceed the lower plane of the reinforcing mesh but does not fall, thus wrapping the reinforcing mesh.

Example 2

A metal mesh or non-metal mesh with a certain rigidity is used as a bottom mesh, a first layer of concrete is directly printed on the bottom mesh; as the 3-D printed concrete has excellent cohesiveness, the first layer of printed concrete wraps the bottom mesh in the concrete, and the concrete and the bottom mesh are combined into a whole without collapsing; and after the first layer of concrete is set to reach a certain strength, multiple layers of concrete can be continuously printed thereon until a predetermined thickness is reached. The bottom mesh can support the first layer of printed concrete alone, and then the reinforcing cage is laid on the first layer of concrete; or the bottom mesh can be hung at the lower part of the reinforcing cage, and then the concrete is printed on the bottom mesh. According to the structure arrangement of the horizontal load-bearing member, the bottom mesh can employ a plane mesh or a curved mesh, or can also be prefabricated into a V shape or a wave shape to enhance the rigidity.

The combined accessory of an in-situ concrete 3-D printed horizontal load-bearing member includes the 3-D printed concrete and the bottom mesh. The 3-D printed concrete can be any 3D printed concrete. The coarse aggregates, namely, the stones, in the 3-D printed concrete are not limited in specification; the fine aggregates in the 3-D printed concrete have the particle size of 0.08 mm-4.75 mm (for fine aggregates which can be used for 3D printed concrete).

A preparation method of the in-situ concrete 3-D printed horizontal load-bearing member in this example employs the 3-D printed concrete and the bottom mesh in the example 1, and comprises the following steps:

(1) providing the bottom mesh according to the structure and span of the horizontal load-bearing member.

(2) when the bottom mesh bears the weight alone: fixing two or four sides of the bottom mesh to connection embedded parts reserved on support walls on two sides of four sides in a welding or binding mode, then directly printing the first layer of 3-D printed concrete on the bottom mesh, and enabling the first layer of printed concrete to flow out through the meshes of the bottom mesh to wrap the bottom mesh;

when the bottom mesh and the reinforcing cage bear the weight together: binding the bottom mesh to the lower part of the reinforcing cage, and placing a spacer block between the reinforcing cage and the bottom mesh to control a distance between the reinforcing cage and the bottom mesh, and then directly printing the first layer of 3-D printed concrete on the bottom mesh; or laying the reinforcing cage on the first layer of printed concrete after the setting of the first layer of concrete; and (3) after the first layer of concrete is set, continuing the printing of the 3-D printed concrete on the first layer of concrete until a predetermined thickness of the horizontal load-bearing member is reached.

When only the bottom mesh bears the weight of the first layer of 3-D printed concrete alone, the diameter of the reinforcing bar of the bottom mesh is larger than or equal to 1 mm, and when the bottom mesh and the reinforcing cage bear the weight of the first layer of 3-D printed circuit together, the diameter of the reinforcing bar of the bottom mesh is larger than or equal to 0.5 mm.

When the span of the horizontal load-bearing member is smaller than or equal to 4.2 m, the bottom mesh is used to bear the weight alone; and when the span of the horizontal load-bearing member is larger than 4.2 m, the bottom mesh and the reinforcing cage are used to bear the weight together.

The interrelationship among the structure and the mesh of the bottom mesh, the particle size of the fine aggregates of the cast concrete, and the fluidity of the concrete of the present disclosure is illustrated by the following Example 3 and Example 4.

Example 3. Process Approach with the Reinforcing Cage

Background information: an arch dome of a building has a diagonal span of 3 m and column supports at four corners, and is fabricated using an in-situ support-free concrete 3-D printing method.

The specific process flows are as follows:

(1) the reinforcing cage is fabricated according to the geometric size of a curved surface of the arch dome, four corners of the reinforcing cage are bound or welded to the column supports, and thus the rigidity of the reinforcing cage can bear the construction load of the first layer of printing, as shown in FIG. 1.

Figures 2A, 2B:
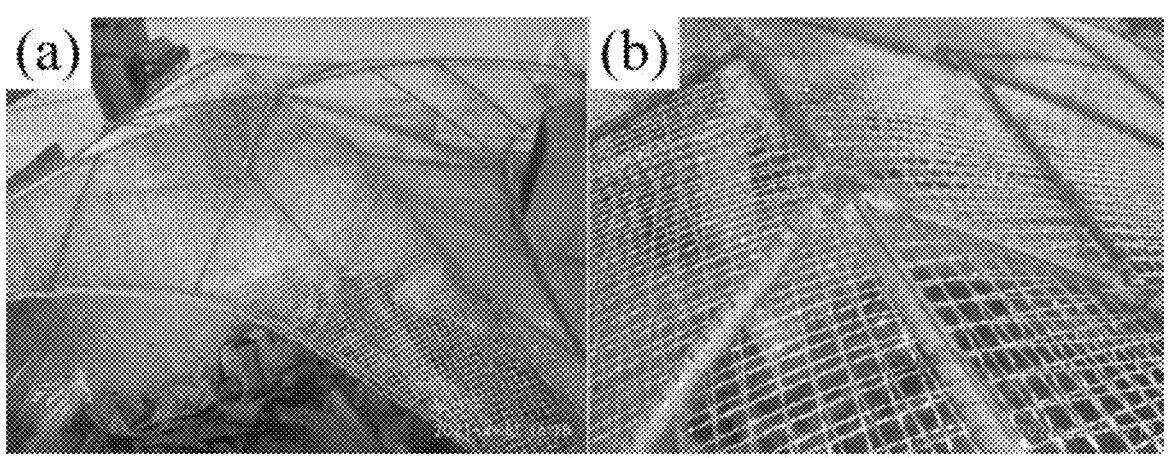
FIG. 2a is an overall diagram of a bottom mesh hanging at the bottom of a reinforcing cage in an example 1 of the present disclosure.
FIG. 2b is a partial detailed diagram of a bottom mesh hanging at the bottom of a reinforcing cage in an example 1 of the present disclosure.

(2) A steel wire mesh with a net mesh size of 10 mm×10 mm is used as the bottom mesh (the diameter of the steel wire is 1 mm), the bottom mesh is bound to the bottom of the reinforcing cage, and a spacer block having a thickness of 5 mm is placed between the steel wire mesh and the reinforcing cage to control the spacing distance there between, as shown in the overall diagram of FIG. 2a and in the partial detailed diagram of FIG. 2b.

(3) The medium sand or coarse sand having the maximum particle size of 3 mm is used as the fine aggregate to prepare the concrete by mixing, the fluidity is controlled between 150 mm and 180 mm, a first layer of concrete is printed, the diameter of a printing nozzle is 35 mm, as shown in FIG. 3a, the reinforcing cage or the bottom mesh cannot be vibrated in the printing process, and a bottom surface diagram of the bottom mesh after the printing of the first layer of 3-D concrete is shown in FIG. 3b.

The first layer of concrete naturally flows to permeate along the meshes to wrap the bottom mesh and the reinforcing bars, if partial reinforcing cage cannot be completely wrapped by one layer of concrete due to a higher height, partial second-layer printing can be conducted immediately along the reinforcing cage after the first layer of printing is completed, thus making the reinforcing cage be completely wrapped in the concrete. FIG. 4a is an overall effect diagram of a front surface face after the printing of the first layer of concrete, and FIG. 4b is an overall effect diagram of a bottom surface after the printing of the first layer of concrete.

After the first layer of concrete is printed, normal maintenance is carried out until the concrete can bear subsequent construction load, and then multiple layers of stacked concrete are continuously printed until the designed thickness is reached. FIG. 5a is an overall effect diagram after the 3-D printing of the second layer of concrete, and FIG. 5b is a partial effect diagram after the 3-D printing of the second layer of concrete.

FIG. 6a shows a 3 person (total weight of 2.05 KN) loading test after 4 days of age of the 3-D printing of the second layer of concrete.

FIG. 6a shows a 5 person (total weight of 3.25 KN) loading test after 4 days of age of the 3-D printing of the second layer of concrete.

(5) the concrete is normally maintained for 24 hours after all printing is completed, that is, the bottom of the roof can be smoothed by plastering.

Example 4, Process Approach with the Bottom Mesh and without the Reinforcing Cage Background information: a flat roof with a net span of 4.2 m in a short direction and a span of 12 m in a long direction. The flat roof is fabricated using an in-situ support-free concrete 3-D printing method.

Figure 7:
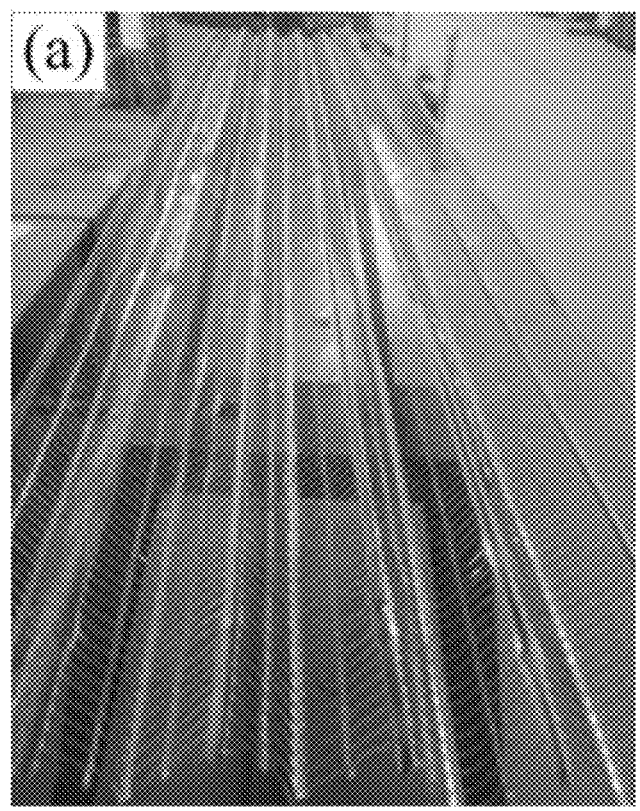
FIG. 7 is a diagram that W-shaped expanded metal is used as the bottom mesh for support-free concrete 3-D printing of a flat roof in an example 2 of the present disclosure.
Figure 8:
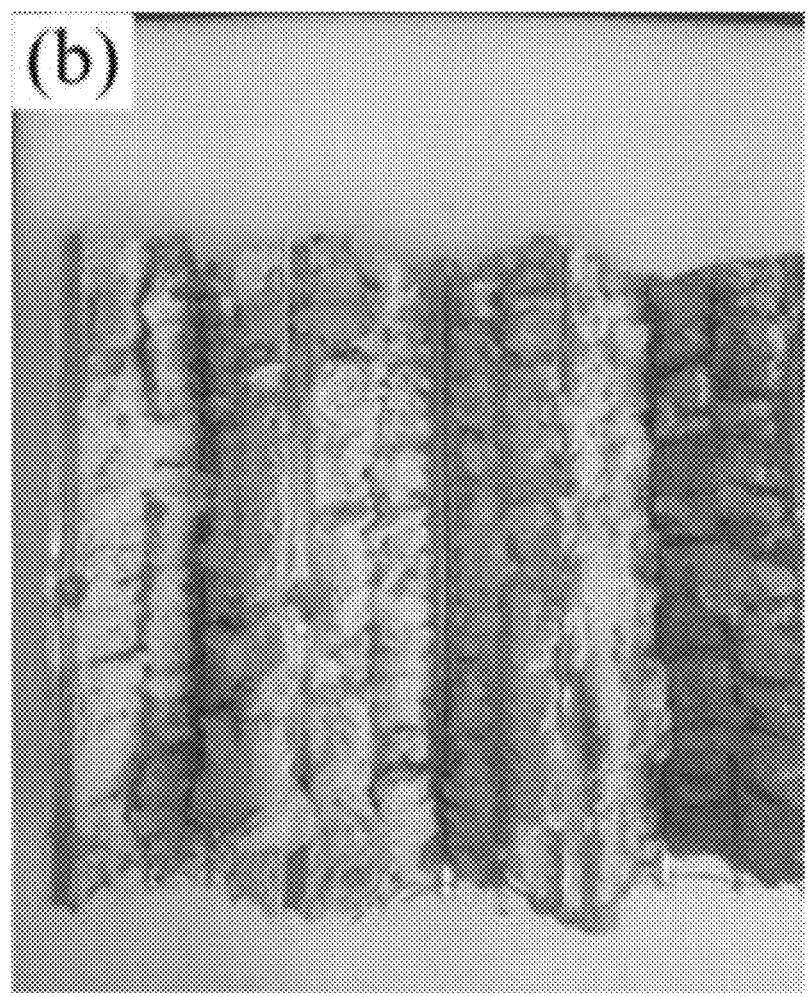
FIG. 8 is a diagram of a bottom surface of the bottom mesh without plastering after printing is completed in an example 2 of the present disclosure.

Specific exemplary process flows are as follows:
(1) Expanded metal with a net mesh size of 7.5 mm×7.5 mm is used as the bottom mesh, and the expanded metal is prefabricated into a W-shaped or wavy single sheet having a length of 4.5 m and a width of 1 m. As shown in FIG. 7, the W-shaped expanded metal is used as the bottom mesh for support-free concrete 3-D printing of the flat roof.
(2) The single sheets are placed on a support wall to be spliced into the whole bottom mesh, and the side edges of the single sheets are overlapped and fixed in a welding or binding mode. The two or four sides of the whole bottom mesh are fixed to the connection embedded parts reserved on the support walls on two or four sides for in a welding or binding mode.
(3) The middle part of the bottom mesh should be properly arched when the bottom mesh is fixed, and generally, the arching is not lower than 1.0%.
(4) The medium sand or coarse sand having the maximum particle size of 2 mm is used as the aggregates to prepare the concrete by mixing, the fluidity is controlled between 140 mm to 170 mm, the first layer of concrete is printed, the diameter of the printing nozzle is 25 mm, and the bottom mesh cannot be vibrated in the printing process. The first layer of concrete flows naturally to wrap the bottom mesh. FIG. 8 shows a diagram of a bottom surface of the bottom mesh without plastering after the printing is completed.
(5) After the first layer of concrete is printed, the normal maintenance can be carried out until the concrete can bear the subsequent construction load, it is designed to place the stressed reinforcing bar or the reinforcing cage on the first layer of concrete, and then multiple layers of stacked concrete are continuously printed until the designed thickness is reached.
(6) The concrete is maintained for 24 hours after all printing is completed, and then the bottom of the roof can be smoothed by plastering.

Apparently, above disclosure are merely examples list for clarity of illustration and are not limiting of the examples. For those of ordinary skill in the art, variations or changes in other different forms can also be made based on the above illustration. It is not necessary or possible to exhaust all examples here. The obvious variations or changes derived therefrom are still within the scope of protection of the claims of the present disclosure.

What is claimed is:

1. A preparation method of an in-situ concrete 3-D printed horizontal load-bearing member, wherein 3-D printed concrete and a bottom mesh are adopted, wherein the 3-D printed concrete contains fine aggregate having a particle size of 0.08 mm-4.75 mm, and a fluidity of the 3-D printed concrete is larger than or equal to 110 mm and smaller than or equal to 190 mm; the bottom mesh is a reinforcing mesh or expanded metal, a diameter of a reinforcing bar of the bottom mesh is larger than or equal to 0.5 mm, and a mesh aperture of the reinforcing mesh is smaller than or equal to 7.5 times of an upper limit of the particle size of the fine aggregate and is larger than or equal to 7.5 times of a lower limit of the particle size of the fine aggregate, and the method comprises:
   (1) providing the bottom mesh according to a structure and span of the horizontal load-bearing member;
   (2) when the bottom mesh bears a weight of a first layer of 3-D printed concrete alone: fixing two or four sides of the bottom mesh to connection embedded parts reserved on support walls on two sides or four sides in a welding or binding mode, then directly printing the first layer of 3-D printed concrete on the bottom mesh, and enabling the first layer of 3-D printed concrete to flow out through meshes of the bottom mesh to wrap the bottom mesh; or paving a reinforcing cage on the first layer of 3-D printed concrete after a setting of the first layer of 3-D printed concrete;
   when the bottom mesh and the reinforcing cage bear the weight of the first layer of 3-D printed concrete together: binding the bottom mesh at a lower part of the reinforcing cage, and placing a spacer block between the reinforcing cage and the bottom mesh to control a distance between the reinforcing cage and the bottom mesh, and then directly printing the first layer of 3-D printed concrete on the bottom mesh; and
   (3) after the setting of the first layer of 3-D printed concrete, continuing the printing of the 3-D printed concrete on the first layer of 3-D printed concrete until a predetermined thickness of the horizontal load-bearing member is reached.

2. The preparation method of the in-situ concrete 3-D printed horizontal load-bearing member according to claim 1, wherein the fine aggregate is sand for construction, and the reinforcing bar is made of a metallic material or a non-metallic material.

3. The preparation method of the in-situ concrete 3-D printed horizontal load-bearing member according to claim 1, wherein when only the bottom mesh bears the weight of the first layer of 3-D printed concrete alone, the diameter of the reinforcing bar of the bottom mesh is larger than or equal to 1 mm, and when the bottom mesh and the reinforcing cage bear the weight of the first layer of 3-D printed concrete together, the diameter of the reinforcing bar of the bottom mesh is larger than or equal to 0.5 mm.

4. The preparation method of the in-situ concrete 3-D printed horizontal load-bearing member according to claim 1, wherein when the span of the horizontal load-bearing member is smaller than or equal to 4.2 mm, the bottom mesh is used to bear the weight of the first layer of 3-D printed concrete alone; and when the span of the horizontal load-bearing member is larger than 4.2 m, the bottom mesh and the reinforcing cage are used to bear the weight of the first layer of 3-D printed concrete together.

5. The preparation method of the in-situ concrete 3-D printed horizontal load-bearing member according to claim 1, wherein, according to a structure of the horizontal load-bearing member, the bottom mesh can be a plane bottom mesh, a curved bottom mesh, a V shape or a wave shape.

* * * * *